US011261302B2

United States Patent
Ito et al.

(10) Patent No.: US 11,261,302 B2
(45) Date of Patent: Mar. 1, 2022

(54) MODIFIED CELLULOSE NANOFIBER AND RUBBER COMPOSITION INCLUDING THE SAME

(71) Applicant: NIPPON PAPER INDUSTRIES CO., LTD., Kita-ku (JP)

(72) Inventors: Kotaro Ito, Tokyo (JP); Shinichi Onogi, Tokyo (JP); Yusuke Yasukawa, Tokyo (JP); Masahiro Morita, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 278 days.

(21) Appl. No.: 16/315,527

(22) PCT Filed: Jul. 5, 2017

(86) PCT No.: PCT/JP2017/024708
§ 371 (c)(1),
(2) Date: Jan. 4, 2019

(87) PCT Pub. No.: WO2018/008700
PCT Pub. Date: Jan. 11, 2018

(65) Prior Publication Data
US 2019/0211163 A1    Jul. 11, 2019

(30) Foreign Application Priority Data

Jul. 7, 2016  (JP) .............................. JP2016-135313

(51) Int. Cl.
| | |
|---|---|
| C08L 1/02 | (2006.01) |
| C08L 21/00 | (2006.01) |
| C08K 3/06 | (2006.01) |
| C08B 11/14 | (2006.01) |
| C08B 15/06 | (2006.01) |
| C08L 21/02 | (2006.01) |
| C08J 5/04 | (2006.01) |
| B60C 1/00 | (2006.01) |

(52) U.S. Cl.
CPC .................. *C08J 5/046* (2013.01); *B60C 1/00* (2013.01); *C08B 11/14* (2013.01); *C08B 15/06* (2013.01); *C08K 3/06* (2013.01); *C08L 1/02* (2013.01); *C08L 21/00* (2013.01); *C08L 21/02* (2013.01); *C08J 2321/02* (2013.01)

(58) Field of Classification Search
CPC ....... C08J 5/046; C08J 2321/02; C08B 11/14; C08B 15/06; C08L 1/02; C08L 21/00; C08L 21/02; C08K 3/06
USPC ........................................................ 524/31
See application file for complete search history.

(56) References Cited

U.S. PATENT DOCUMENTS

| | | | |
|---|---|---|---|
| 2007/0241480 A1 | 10/2007 | Kanenari et al. | |
| 2010/0129452 A1 | 5/2010 | Ito et al. | |
| 2011/0129505 A1 | 6/2011 | Kaneko et al. | |
| 2015/0011685 A1* | 1/2015 | Mori ....................... | C08B 15/06 524/35 |
| 2015/0166741 A1 | 6/2015 | Ikuma et al. | |

FOREIGN PATENT DOCUMENTS

| | | |
|---|---|---|
| CN | 101605817 A | 12/2009 |
| CN | 101903407 A | 12/2010 |
| CN | 104024334 A | 9/2014 |
| CN | 104220463 A | 12/2014 |
| CN | 105419002 A | 3/2016 |
| JP | 2006-206864 A | 8/2006 |
| JP | 2011-148914 A | 8/2011 |
| JP | 2014-125607 A | 7/2014 |
| JP | 2015-48365 A | 3/2015 |
| JP | 2017-52942 A | 3/2017 |
| WO | WO 2006/070770 A1 | 7/2006 |
| WO | WO 2008/096894 A1 | 8/2008 |
| WO | WO 2009/078492 A1 | 6/2009 |
| WO | WO 2013/147063 A1 | 10/2013 |
| WO | WO 2014/181560 A1 | 11/2014 |
| WO | WO 2015/050117 A1 | 4/2015 |
| WO | WO 2015/107995 A1 | 7/2015 |

OTHER PUBLICATIONS

Kato, H., "Reinforcement effect of surface chemically modified cellulose nanofibers in natural rubber", Sustainable humanosphere: bulletin of Research Institute for Sustainable Humanosphere Kyoto University, Textversion, Feb. 1, 2013, vol. 8, p. 39 (with cover page).

Elsa Lasseuguette, "Grafting onto microfibrils of native cellulose," Cellulose, vol. 15, 2008, pp. 571-580.

Shuji Fujisawa, et al., "Surface modification of TEMPO-oxidized cellulose nanofibers," Preprints of 2010 Cellulose R&D 17th Annual Meeting of the Cellulose Society of Japan, Jul. 2010, 5 Pages (with partial English language translation).

Ramon Weishaupt, et al., "TEMPO-Oxidized Nanofibrillated Cellulose as a High Density Carrier for Bioactive Molecules," Biomacromolecules, vol. 16, 2015, pp. 3640-3650.

Ryuji Hirase, et al., "Nanofibrillation and chemical modification of TEMPO-oxidized pulps using amines," Polymer Preprints, Japan, vol. 65, No. 2, 2016, 9 Pages (with partial English language translation).

(Continued)

*Primary Examiner* — Kelechi C Egwim
(74) *Attorney, Agent, or Firm* — Oblon, McClelland, Maier & Neustadt, L.L.P.

(57) ABSTRACT

The present invention aims to provide a rubber composition having sufficient reinforcement and fatigue resistance even when a large strain is applied thereto, and the present invention is to provide a substituted carboxy group-containing modified cellulose nanofiber wherein at least part thereof has at least any one of a substituent represented by Formula (a): —CONH—$R^1$ and a substituent represented by Formula (b): —COO—$R^1$ (in Formulae (a) and (b), $R^1$ is independently a $C_{3-30}$ hydrocarbon having at least one unsaturated bond), and a rubber composition including the same.

13 Claims, No Drawings

(56) References Cited

OTHER PUBLICATIONS

Combined Chinese Office Action and Search Report dated Jul. 6, 2021 in Chinese Patent Application No. 201780041638.1 (with English translation), 29 pages.
"Polymer Modification ($3^{rd}$ Edition)" Kingdom Ed., China Light Industry Press, May 31, 2016, pp. 76-77 (with partial English translation).

* cited by examiner

MODIFIED CELLULOSE NANOFIBER AND RUBBER COMPOSITION INCLUDING THE SAME

TECHNICAL FIELD

The present invention relates to a substituted carboxy group-containing modified cellulose nanofiber and a rubber composition including the same.

BACKGROUND ART

Recently, there are known techniques for improving a variety of strengths in a rubber composition, such as tensile strength, by mixing a material produced by defibrating plant fibers to a nanometer level, called cellulose nanofiber, into the rubber composition.

For example, Patent Document 1 describes a rubber/short fiber masterbatch obtained by stirring and mixing short fibers having an average diameter of less than 0.5 µm and a rubber latex, in which cellulose is given as an example of the short fibers. According to this document, short fibers having an average fiber diameter of less than 0.5 µm are fibrillated in water in advance to produce a dispersion, the dispersion is mixed with a rubber latex, and then the resultant is dried. Thereby, the short fibers are uniformly dispersed in the rubber. By using this rubber/short fiber masterbatch, a rubber composition having a well balance between rubber reinforcement and fatigue resistance can be obtained.

PRIOR ART DOCUMENTS

Patent Documents

Patent Document 1: JP-A-2006-206864

SUMMARY OF INVENTION

Problem to be Solved by the Invention

In the rubber composition in Patent Document 1, the short fibers and the rubber component are thought to be bonded by intermolecular forces. However, the intermolecular forces are relatively weak bonding among the kinds of bonds. Therefore, when a large strain is applied to this rubber composition, there may be a case that the bonds are broken to generate spaces between the short fibers and the rubber component. Consequently, sufficient reinforcement and fatigue resistance may not be achieved.

The present invention is then aimed to provide a rubber composition having sufficient reinforcement and fatigue resistance even when a large strain is applied thereto.

Means for Solving Problem

In order to solve the problem above, the inventors of the present invention have conducted elaborated studies. More specifically, a carboxy group or a group including a carboxy group was introduced into cellulose nanofiber, and a substituent including a hydrocarbon group having an unsaturated bond was further introduced into the carboxy group of the resultant carboxy group-containing modified cellulose nanofiber. It has been found that, when the thus obtained substituted carboxy group-containing modified cellulose nanofiber is combined with a rubber component, it is possible to perform a crosslinking reaction with a crosslinking agent such as sulfur by dehydrogenation from C—H of α-methyl or α-methylene located adjacent to their unsaturated bonds.

Specifically, the present invention provides the following.

[1] A substituted carboxy group-containing modified cellulose nanofiber, wherein at least part of a carboxy group-containing modified cellulose nanofiber comprises at least any one of a substituent represented by Formula (a) and a substituent represented by Formula (b) below:

—CONH—$R^1$    Formula (a):

—COO—$R^1$    Formula (b):

(in Formulae (a) and (b), $R^1$ is independently a $C_{3-30}$ hydrocarbon having at least one unsaturated bond).

[2] The substituted carboxy group-containing modified cellulose nanofiber according to [1], wherein the carboxy group-containing modified cellulose nanofiber is an oxidized cellulose nanofiber or a carboxymethylated cellulose nanofiber.

[3] The substituted carboxy group-containing modified cellulose nanofiber according to [2], wherein a carboxy group content of the oxidized cellulose nanofiber is 0.6 mmol/g to 2.0 mmol/g with respect to a bone-dry mass of the oxidized cellulose nanofiber.

[4] The substituted carboxy group-containing modified cellulose nanofiber according to [2], wherein a degree of substitution with carboxymethyl group per glucose unit of the carboxymethylated cellulose nanofiber is 0.01 to 0.50.

[5] The substituted carboxy group-containing modified cellulose nanofiber according to any one of [1] to [4], wherein the substituted carboxy group-containing modified cellulose nanofiber is at least any one of an amidation product and an esterification product of at least any one of an aliphatic unsaturated amine as well as an aliphatic unsaturated alcohol and the carboxy group-containing modified cellulose nanofiber.

[6] The substituted carboxy group-containing modified cellulose nanofiber according to [5], wherein a reaction rate of the aliphatic unsaturated amine and the aliphatic unsaturated alcohol is 10% or more.

[7] A manufacturing method of a substituted carboxy group-containing modified cellulose nanofiber, the method comprising: introducing at least any one of substituent selected from a group consisting of a substituent represented by Formula (a) and a substituent represented by Formula (b) below into at least part of a carboxy group-containing modified cellulose nanofiber; and performing a dehydration condensation in water:

—CONH—$R^1$    Formula (a):

—COO—$R^1$.    Formula (b):

[8] The manufacturing method according to [7], wherein the dehydration condensation is performed by using at least one dehydration condensation agent selected from a group consisting of 1-ethyl-3-(3-dimethylaminopropyl)-carbodiimide, a hydrochloride thereof, and 4-(4,6-dimethoxy-1,3,5-triazin-2-yl)-4-methylmorpholinium chloride n-hydrate.

[9] The manufacturing method according to [7] or [8], wherein the introducing of at least one substituent selected from the group consisting of the substituent represented by Formula (a) and the substituent represented by Formula (b) is performed by introducing at least any one of an aliphatic unsaturated amine and an aliphatic unsaturated alcohol into the carboxy group-containing modified cellulose nanofiber.

[10] The manufacturing method according to [9], wherein a reaction rate of the aliphatic unsaturated amine and the aliphatic unsaturated alcohol is 10% or more.

[11] A manufacturing method of producing a rubber composition, the method comprising: a step of manufacturing a substituted carboxy group-containing modified cellulose nanofiber by the manufacturing method according to any one of [7] to [10]; and a step of performing vulcanization after dehydration condensation.

[12] A rubber composition comprising: the substituted carboxy group-containing modified cellulose nanofiber according to any one of [1] to [6]; and a rubber component.

[13] The rubber composition according to [12], further comprising sulfur.

Effect of the Invention

The present invention provides a rubber composition having sufficient reinforcement and fatigue resistance even when a large strain is applied thereto.

The possible reason why the rubber composition of the present invention achieves such effects is, although not clear, as follows. Since the modified cellulose nanofiber and the rubber component are chemically strongly bonded by covalent bonds through sulfur, such bonds are hard to be broken even when a large strain is applied to the rubber composition. This is thought to improve the strength of the rubber composition.

EMBODIMENTS FOR CARRYING OUT THE INVENTION

<Carboxy Group-Containing Modified Cellulose Nanofiber>

The modified cellulose nanofiber is a fine fiber obtained from a cellulose raw material through modification and defibration. The carboxy group-containing modified cellulose nanofiber means a modified cellulose nanofiber having at least one carboxy group. A carboxy group may be bonded to the cellulose backbone, or a group including a carboxy group (examples: carboxyalkyl group such as carboxymethyl group; carboxylate group; aldehyde group) may be bonded.

<Cellulose Raw Material>

The derivation of the cellulose raw material is not particularly limited, and, for example, plants (for example, wood, bamboo, hemp, jute, kenaf, residue from agricultural land, cloth, pulp (softwood unbleached kraft pulp (NUKP), softwood bleached kraft pulp (NBKP), hardwood unbleached kraft pulp (LUKP), hardwood bleached kraft pulp (LBKP), softwood unbleached sulfite pulp (NUSP), softwood bleached sulfite pulp (NBSP), thermomechanical pulp (TMP), regenerated pulp, used paper, and the like), animals (for example, ascidians), algae, microorganisms (for example, acetic acid bacteria (*Acetobacter*)), and microbial products. The cellulose raw material used in the present invention may be any one of them or a combination of two or more. The cellulose raw material is preferably a plant-derived or microorganism-derived cellulose raw material (for example, cellulose fiber), and more preferably a plant-derived cellulose raw material (for example, cellulose fiber).

The number average fiber diameter of the cellulose raw material is not particularly limited, and, in the case of the softwood kraft pulp and the hardwood kraft pulp that are general pulps, the former is about 30 to 60 µm and the latter is about 10 to 30 µm, respectively. In the case of other pulps being subjected to general refining, the number average fiber diameter thereof is about 50 µm. For example, in the case of the ones obtained by refining raw materials having a size of several centimeters such as chips, it is preferable to adjust the number average fiber diameter thereof to about 50 µm by mechanically treating with a disintegrator such as a refiner and a beater.

<Average Fiber Diameter>

The average fiber diameter of the modified cellulose nanofiber is preferably 2 nm or more or 500 nm or less, more preferably about 4 to 300 nm. The average fiber diameter and the average fiber length of the cellulose nanofiber can be obtained by observing each fiber using an atomic force microscope (AFM) or a transmission electron microscope (TEM), determining each fiber diameter as well as each fiber length, and then averaging the determined fiber diameters as well as fiber lengths, respectively.

<Average Aspect Ratio>

The average aspect ratio of the modified cellulose nanofiber is generally 10 or more. The upper limit is not particularly limited, and generally 1000 or less. The average aspect ratio can be calculated by the following equation:

Aspect ratio=Average fiber length/Average fiber diameter.

<Introduction of Substituent Including Carboxy Group>

A manufacturing method of a carboxy group-containing modified cellulose nanofiber is not particularly limited, and an example is a modification method in which a carboxy group or a substituent including a carboxy group is introduced while modifying a cellulose raw material. The modification method is not particularly limited, and examples thereof include oxidation, etherification, phosphorylation, esterification, silane coupling, fluorination, and cationization. Among those, oxidation and carboxymethylation are preferred.

<Oxidation>

The amount of a carboxy group is preferably 0.5 mmol/g or more or 0.6 mmol/g or more, more preferably 0.8 mmol/g or more, and further preferably 1.0 mmol/g or more, with respect to the bone-dry mass of the cellulose nanofiber included in the carboxy group-containing modified cellulose nanofiber (oxidized cellulose nanofiber) obtained by modifying a cellulose raw material by oxidation. The upper limit is preferably 3.0 mmol/g or less, more preferably 2.5 mmol/g or less, and further preferably 2.0 mmol/g or less. Therefore, 0.5 mmol/g to 3.0 mmol/g or 0.6 mmol/g to 3.0 mmol/g is preferable, 0.8 mmol/g to 2.5 mmol/g or 0.6 mmol/g to 2.5 mmol/g is more preferable, and 1.0 mmol/g to 2.0 mmol/g or 0.6 mmol/g to 2.0 mmol/g is further preferable.

The oxidation method is not particularly limited, and an example thereof is an oxidation in water using an oxidizing agent in the presence of an N-oxyl compound and a compound selected from the group consisting of a bromide, an iodide, or a mixture thereof. According to this method, the primary hydroxy group at the C6 position of the glucopyranose ring on the cellulose surface is selectively oxidized to generate a group selected from a group consisting of an aldehyde group, a carboxy group, and a carboxylate group. The concentration of the cellulose raw material during reaction is not particularly limited, and preferably 5% by weight or less.

The N-oxyl compound refers to a compound capable of generating nitroxyl radicals. An example of the N-oxyl compound is 2,2,6,6-tetramethylpiperidine 1-oxyl (TEMPO). Any compound that promotes the intended oxidation reaction can be used as the N-oxyl compound.

The amount of the N-oxyl compound to be used is not particularly limited as long as it is the catalytic amount capable of oxygenating the cellulose serving as a raw material. For example, the amount is preferably 0.01 mmol or more, and more preferably 0.02 mmol or more, with respect to 1 g of the bone-dry cellulose. The upper limit is preferably 10 mmol or less, more preferably 1 mmol or less, and further preferably 0.5 mmol or less. Therefore, the amount of the N-oxyl compound to be used is preferably 0.01 to 10 mmol, more preferably 0.01 to 1 mmol, and further preferably 0.02 to 0.5 mmol, with respect to 1 g of the bone-dry cellulose.

The bromide is a compound including bromine, and examples thereof include alkali metal bromides capable of being ionized by dissociation in water, such as sodium bromide. The iodide is a compound including iodine, and examples thereof include alkali metal iodides. The amount of the bromide or the iodide to be used may be selected in a range that can promote an oxidation reaction. The total amount of the bromide and the iodide is preferably 0.1 mmol or more, and more preferably 0.5 mmol or more, with respect to 1 g of the bone-dry cellulose. The upper limit is preferably 100 mmol or less, more preferably 10 mmol or less, and further preferably 5 mmol or less. Therefore, the total amount of the bromide and the iodide is preferably 0.1 to 100 mmol, more preferably 0.1 to 10 mmol, and further preferably 0.5 to 5 mmol, with respect to 1 g of the bone-dry cellulose.

The oxidizing agent is not particularly limited, and examples thereof include halogens, hypohalous acids, halous acids, perhalic acids or salts thereof, halogen oxides, and peroxides. Among those, hypohalous acids or salts thereof are preferable, hypochlorous acids or salts thereof are more preferable, and sodium hypochlorite is further preferable, because they are low in cost and less environmental load. The amount of the oxidizing agent to be used is preferably 0.5 mmol or more, more preferably 1 mmol or more, and further preferably 3 mmol or more, with respect to 1 g of the bone-dry cellulose. The upper limit is preferably 500 mmol or less, more preferably 50 mmol or less, and further preferably 25 mmol or less. Therefore, the amount of the oxidizing agent to be used is preferably 0.5 to 500 mmol, more preferably 0.5 to 50 mmol, further preferably 1 to 25 mmol, and further more preferably 3 to 10 mmol, with respect to 1 g of the bone-dry cellulose. When the N-oxyl compound is used, the amount of the oxidizing agent to be used is preferably 1 mol or more, with respect to 1 mol of the N-oxyl compound. The upper limit is preferably 40 mol. Therefore, the amount of the oxidizing agent to be used is preferably 1 to 40 mol, with respect to 1 mol of the N-oxyl compound.

The conditions during an oxidation reaction, such as pH and temperature, are not particularly limited. In general, the reaction proceeds efficiently under relatively mild conditions. The reaction temperature is preferably 4° C. or higher, more preferably 15° C. or higher. The upper limit is preferably 40° C. or lower, more preferably 30° C. or lower. Therefore, the reaction temperature is preferably 4 to 40° C., and may be about 15 to 30° C., that is, room temperature. The pH of the reaction solution is preferably 8 or more, and more preferably 10 or more. The upper limit is preferably 12 or less, and more preferably 11 or less. Therefore, the pH of the reaction solution is preferably 8 to 12, and more preferably about 10 to 11. Carboxy groups are usually generated in the cellulose as the oxidation reaction proceeds, and therefore the pH of the reaction solution tends to decrease. Accordingly, it is preferable to keep the pH of the reaction solution within the range above by adding an alkaline solution such as an aqueous sodium hydroxide in order to allow the oxidation reaction to proceed efficiently. The reaction medium in oxidation is preferably water because it is easy to handle and hard to cause side reactions.

The reaction time in the oxidation reaction can be set as appropriate in accordance with the degree of oxidation progress, generally 0.5 hours or longer. The upper limit is usually 6 hours or shorter, preferably 4 hours or shorter. Therefore, the reaction time in oxidation is generally 0.5 to 6 hours, for example, about 0.5 to 4 hours.

The oxidation may be performed in reactions in two or more stages. For example, the oxidized cellulose obtained by filtration after the termination of the reaction in the first stage may be oxidized again in the same or different reaction condition. Thereby, the cellulose can be oxidized efficiently without inhibiting the oxidation reaction by sodium chloride produced as a by-product at reaction in the first stage.

Another example of the carboxylation (oxidation) method is an oxidation method by ozonation treatment. In this oxidation reaction, the hydroxy groups at least at the 2- and 6-positions of the glucopyranose ring are oxidized, and the cellulose chain is broken. The ozonation treatment is usually performed by bringing the cellulose raw material into contact with an ozone-containing gas. The ozone concentration in the gas is preferably 50 $g/m^3$ or more. The upper limit is preferably 250 $g/m^3$ or less, and more preferably 220 $g/m^3$ or less. Therefore, the ozone concentration in the gas is preferably 50 to 250 $g/m^3$, and more preferably 50 to 220 $g/m^3$. The amount of ozone to be added is preferably 0.1 part by mass or more, and more preferably 5 parts by mass or more, with respect to 100 parts by mass of the solid content of the cellulose raw material. The upper limit is generally 30 parts by mass or less. Therefore, the amount of ozone to be added is preferably 0.1 to 30 parts by mass, and more preferably 5 to 30 parts by mass, with respect to 100 parts by mass of the solid content of the cellulose raw material. The ozonation treatment temperature is generally 0° C. or higher, and preferably 20° C. or higher. The upper limit is generally 50° C. or lower. Therefore, the ozonation treatment temperature is preferably 0 to 50° C., and more preferably 20 to 50° C. The ozonation treatment time is generally 1 minute or longer, and preferably 30 minutes or longer. The upper limit is generally 360 minutes or shorter. Therefore, the ozonation treatment time is about 1 to 360 minutes, preferably about 30 to 360 minutes. When the ozonation treatment conditions is set within these ranges, it is possible to prevent the cellulose from being excessively oxidized and decomposed. Therefore, the yield of the oxidized cellulose may be satisfied.

The post-oxidation treatment may be performed to the resultant obtained after ozonation treatment using an oxidizing agent. The oxidizing agent used in the post-oxidation treatment is not particularly limited, and examples thereof include chlorine compounds such as chlorine dioxide and sodium chlorite; oxygen, hydrogen peroxide, persulfuric acid, and peracetic acid. The example of the post-oxidation treatment method is dissolving these oxidizing agents in water or a polar organic solvent such as an alcohol to prepare a solution of the oxidizing agent, followed by immersing the cellulose raw material therein.

The amount of the carboxy group, the carboxylate group, and the aldehyde group included in the oxidized cellulose nanofiber can be adjusted by controlling the amount of the oxidizing agent to be added and the reaction time.

An example of the method of measuring the carboxy group content is described below. After 60 ml of a 0.5% by mass slurry (aqueous dispersion) of the oxidized cellulose is prepared and adjusted to pH 2.5 by adding a 0.1 M aqueous hydrochloric acid, a 0.05 N aqueous sodium hydroxide is added dropwise, and the electric conductivity is measured until the pH reaches 11. The carboxy group content can be calculated using the equation below, from the amount of sodium hydroxide (a) consumed during the neutralization stage of weak acid in which change in electric conductivity is mild:

carboxy group content[mmol/g oxidized cellulose or cellulose nanofiber]=a [ml]×0.05/mass [g] of oxidized cellulose <Carboxymethylation>

The degree of substitution with carboxymethyl group per anhydrous glucose unit in the carboxy group-containing modified cellulose nanofiber (carboxylated cellulose nanofiber) obtained by carboxymethylation is preferably 0.01 or more, more preferably 0.05 or more, and further preferably 0.10 or more. The upper limit is preferably 0.50 or less, more preferably 0.40 or less, and further preferably 0.35 or less. Therefore, the degree of substitution with carboxymethyl group is preferably 0.01 to 0.50, more preferably 0.05 to 0.40, further preferably 0.10 to 0.35.

The method of the carboxymethylation is not particularly limited, and example thereof is mercerizing a cellulose raw material as a starting material, followed by etherification. Examples of the solvent include water, alcohol (for example, lower alcohol), and a mixed solvent thereof. Examples of the lower alcohol include methanol, ethanol, n-propyl alcohol, isopropyl alcohol, n-butyl alcohol, isobutyl alcohol, and tertiary butyl alcohol. The ratio of the lower alcohol in the mixed solvent is generally 60% by weight or more or 95% by weight or less, and preferably 60 to 95% by weight. The amount of the solvent is generally 3 times by weight with respect to the cellulose raw material. The upper limit is not particularly limited, and 20 times by weight. Therefore, the amount of the solvent is preferably 3 to 20 times by weight.

The mercerization is generally performed by mixing a starting material and a mercerizing agent. Examples of the mercerizing agent include alkali metal hydroxides such as sodium hydroxide and potassium hydroxide. The amount of the mercerizing agent to be used is preferably 0.5 by mole or more, more preferably 0.7 by mole or more, and further preferably 0.8 by mole or more, per anhydrous glucose residue of the starting material. The upper limit is generally 20 by mole or less, preferably 10 by mole or less, and more preferably 5 by mole or less. Therefore, it is preferably 0.5 to 20 by mole, more preferably 0.7 to 10 by mole, and further preferably 0.8 to 5 by mole.

The reaction temperature of mercerization is generally 0° C. or higher, and preferably 10° C. or higher. The upper limit is 70° C. or lower, and preferably 60° C. or lower. Therefore, the reaction temperature is generally 0 to 70° C., and preferably 10 to 60° C. The reaction time is generally 15 minutes or longer, and preferably 30 minutes or longer. The upper limit is generally 8 hours or shorter, and preferably 7 hours or shorter. Therefore, the reaction time is generally 15 minutes to 8 hours, and preferably 30 minutes to 7 hours.

The etherification reaction is generally performed by adding a carboxymethylating agent to the reaction system after mercerization. An example of the carboxymethylating agent is sodium monochloroacetate. The amount of the carboxymethylating agent to be added is generally preferably 0.05 by mole or more, more preferably 0.5 by mole or more, and further preferably 0.7 by mole or more, per glucose residue of the cellulose raw material. The upper limit is generally 10.0 by mole or less, preferably 5 moles or less, and more preferably 3 by mole or less. Therefore, it is preferably 0.05 to 10.0 by mole, more preferably 0.5 to 5 by mole, and further preferably 0.7 to 3 by mole. The reaction temperature is generally 30° C. or higher, and preferably 40° C. or higher, and the upper limit is generally 90° C. or lower, and preferably 80° C. or lower. Therefore, the reaction temperature is generally 30 to 90° C., and preferably 40 to 80° C. The reaction time is generally 30 minutes or longer, and preferably 1 hour or longer. The upper limit is generally 10 hours or shorter, and preferably 4 hours or shorter. Therefore, the reaction time is generally 30 minutes to 10 hours, and preferably 1 hour to 4 hours. The reaction solution may be stirred during the carboxymethylation reaction, if needed.

An example of the method of measuring the degree of substitution with carboxymethyl group per glucose unit of the carboxymethylated cellulose nanofiber is described below. 1) About 2.0 g of carboxymethylated cellulose fiber (bone dry) is precisely weighed and put into a 300-mL stoppered Erlenmeyer flask. 2) Into the flask, 100 mL of a solution prepared by adding 100 mL of special grade concentrated nitric acid to 1000 mL of methanol is added, and then the resultant mixture is shaken for three hours to convert the carboxymethyl cellulose salt (CM-modified cellulose) into an acid-form CM-modified cellulose. 3) 1.5 to 2.0 g of the acid-form CM-modified cellulose (bone dry) is precisely weighed and put into a 300-mL stoppered Erlenmeyer flask. 4) The acid-form CM-modified cellulose is wetted with 15 mL of 80% methanol, and then 100 mL of 0.1N NaOH is added thereto, followed by shaking the mixture at room temperature for three hours. 5) Using phenolphthalein as an indicator, the excessive NaOH is back-titrated with 0.1N $H_2SO_4$. 6) The degree of substitution with carboxymethyl group (DS) is calculated by the equation below.

$A=[(100 \times F-(0.1N\ H_2SO_4)(mL) \times F') \times 0.1]/$(bone dry mass (g) of acid-form CM-modified cellulose)

$DS=0.162 \times A/(1-0.058 \times A)$

A: the amount of 1N NaOH (mL) required for neutralizing 1 g of hydrogen-form CM-modified cellulose F': the factor of 0.1N $H_2SO_4$ F: the factor of 0.1N NaOH <Substituted Carboxy Group-Containing Modified Cellulose Nanofiber>

The substituted carboxy group-containing modified cellulose nanofiber is a modified cellulose nanofiber having at least one substituent selected from the group consisting of a substituent represented by Formula (a) and a substituent represented by Formula (b) below in at least part of a carboxy group-containing modified cellulose nanofiber. More specifically, the substituted carboxy group-containing modified cellulose nanofiber is a modified cellulose nanofiber having at least one substituent selecting from the group consisting of a substituent represented by Formula (a) and a substituent represented by Formula (b), and may have a carboxy group.

—CONH—$R^1$  Formula (a):

—COO—$R^1$  Formula (b):

$R^1$ in Formulae (a) and (b) is independently a hydrocarbon having at least one unsaturated bond. The carbon number of the hydrocarbon is preferably 3 or more. The upper limit is preferably 30 or less, and preferably 20 or less. Therefore, the carbon number of the hydrocarbon is preferably 3 to 30, and more preferably 3 to 20. The unsaturated bond may be any of a double bond and a triple bond, and preferably a double bond. The upper limit of the number of unsaturated bonds is not particularly limited, and preferably around six or less. When the number of unsaturated bonds is two or more, the lower limit of carbon number of the hydrocarbon group is 2Y+1 (Y is the number of unsaturated bonds). When the unsaturated bond is a double bond, structural isomers of a cis isomer or a trans isomer exist, and any structural isomer may be employed. The hydrocarbon may be linear, may have a branched chain, or may be cyclic.

Examples of $R^1$ include alkenyl groups such as hexenyl group (example: 1-hexenyl group), dodecenyl group (example: 1-dodecenyl group), octadecenyl group (example: 9-octadecenyl group), octadecadienyl group (example: 9,12-octadecadienyl group (linoleyl group)), octadecatrienyl group (example: 9,12,15-octadecatrienyl group), allyl group, propenyl group (1-propenyl group), butyl group (example: 1-butyl group, 3-butyl group), undecenyl group, hexadecenyl group (example: 9-hexadecenyl group (palmitoleyl group), eicosatetraenyl group (arachidonyl group; example: 5,8,11,14-eicosatetraenyl group), docosenyl group, tetramethylhexadecenyl group (example: 3,7,11,15-tetramethyl-1-hexadecenyl group, 3,7,11,15-tetramethyl-2-hexadecenyl group), dimethyloctenyl group (example: 3,7-dimethyl-7-octenyl group), and dimethyloctadienyl group (example: 3,7-dimethyl-1,6-octadienyl group). The substituent represented by Formulae (a) and (b) may have one or two or more substituents.

An example of the group represented by Formula (a) is an amide group having the alkenyl group illustrated as $R^1$. An example of the group represented by Formula (b) is an ester group having the alkenyl group illustrated as $R^1$.

The method of manufacturing the substituted carboxy group-containing modified cellulose nanofiber is not particularly limited, and example thereof is a method of dehydration condensation of an aliphatic unsaturated amine or an aliphatic unsaturated alcohol with the carboxy group in at least one of the carboxy group-containing modified cellulose nanofiber.

The aliphatic unsaturated amine and the aliphatic unsaturated alcohol are an amine and an alcohol each having a hydrocarbon group having at least one unsaturated bond in molecular structure, respectively. The carbon number of the hydrocarbon group is preferably three or more. Thereby, it is possible to perform a reaction with a crosslinking agent such as sulfur by dehydrogenation from C—H of α-methyl or α-methylene positioned adjacent to the unsaturated bond. The upper limit of the carbon number of the hydrocarbon group is 30 or less, and preferably 20 or less. Therefore, the carbon number of the hydrocarbon group is preferably 3 to 30, and more preferably 3 to 20. The hydrocarbon may be linear or may have a branched chain. The unsaturated bond may be any of a double bond and a triple bond, and preferably a double bond. The upper limit of the number of unsaturated bonds is not particularly limited, and preferably about six. When the number of unsaturated bonds is two or more, the lower limit of the carbon number of the hydrocarbon group is 2Y+1 (Y is the number of unsaturated bonds). When the unsaturated bond is a double bond, structural isomers of a cis isomer or a trans isomer exist. The structural isomers, however, are not particularly limited, and either structural isomer can be employed. The aliphatic unsaturated amine can include at least one amino group. The upper limit is not particularly limited, and preferably one, that is, monoamine is preferable. The aliphatic unsaturated alcohol may include at least one hydroxy group. The upper limit is not particularly limited, and preferably one, that is, monoalcohol is preferable.

Examples of the aliphatic unsaturated amine include 1-hexenylamine, 1-dodecenylamine, 9-octadecenylamine (oleylamine), 9,12-octadecadienylamine (linoleamine), 9,12,15-octadecatrienylamine, and linoleylamine, and oleylamine is preferable.

Examples of the aliphatic unsaturated alcohol include allyl alcohol, crotyl alcohol, 3-buten-2-ol, methylvinyl alcohol, oleyl alcohol, linoleyl alcohol, undecylenyl alcohol, palmitoleyl alcohol, arachidonyl alcohol, erucyl alcohol, phytol, isophytol, linalool, and rhodinol, and oleyl alcohol is preferable.

In dehydration condensation, a dehydration condensation agent may be used. The dehydration condensation agent is not particularly limited, and preferably the one capable of using in an aqueous system, and examples thereof include 1-ethyl-3-(3-dimethylaminopropyl)-carbodiimide (EDC) and hydrochloride thereof (EDC.HCl), and 4-(4,6-dimethoxy-1,3,5-triazin-2-yl)-4-methylmorpholinium chloride n-hydrate (DMT-MM). The dehydration condensation agents may be used singly or in combination of two or more. The amount of the dehydration condensation agent is preferably 0.1 mol or more, and more preferably 0.4 mol or more, with respect to 1 mol of glucose unit of the cellulose nanofiber. The upper limit is not particularly limited, and preferably 20 mol or less, and more preferably 10 mol or less. Therefore, it is preferably about 0.1 to 20 mol, and more preferably about 0.4 to 10 mol. Alternatively, the amount of the dehydration condensation agent is preferably 2 by mole or more, more preferably 3 by mole or more, further preferably 4 by mole or more, and further more preferably 5 by mole or more, with respect to the carboxy group or the carboxymethyl group of the cellulose nanofiber. The upper limit is not particularly limited, and preferably 10 by mole or less, more preferably 9 by mole or less, and further preferably 8 by mole or less.

The reaction temperature in dehydration condensation is preferably 10° C. or higher, and more preferably 20° C. or higher. The upper limit is preferably 90° C. or lower, and more preferably 80° C. or lower. Thereby, the generation of the deterioration of the cellulose nanofiber can be suppressed. Therefore, it is preferably about 10 to 90° C., and more preferably about 20 to 80° C. The dehydration condensation is preferably performed in water.

The degree of introduction (DS) of the substituents represented by Formulae (a) and (b) in the substituted carboxy group-containing modified cellulose fiber is preferably 0.01 or more, more preferably 0.03 or more, and further preferably 0.05 or more. The upper limit is preferably 1.5 or less, more preferably 1.3 or less, and further preferably 1.0 or less. Therefore, it is preferably about 0.01 to 1.5. The DS can be determined by an analysis method such as weight increase rate, element analysis, neutralization titration, FT-IR, $^1$H and $^{13}$C-NMR after removing by-products and the like from the substituted carboxy group-containing modified cellulose fiber. The degree of introduction of the substituents represented by Formulae (a) and (b) in the substituted carboxy group-containing modified cellulose fiber may be represented by the reaction rate (%) of the aliphatic unsaturated amine and the aliphatic unsaturated alcohol. The reaction rate is preferably 10% or more, more preferably 20% or more, and further preferably 30% or more. The upper limit is preferably 100% or less, more preferably 95% or less, and further preferably 90% or less. The reaction rate is calculated by the method below.

The carboxy group content (mmol/g) or the degree of substitution with carboxymethyl group (DS) is measured by above method, and the reaction rate is calculated from the differences.

Reaction rate (%)=(value before introduction−value after introduction)/(value before introduction)×100

After the dehydration condensation reaction, the by-product derived from the dehydration condensation agent can be separated and removed from the product by a known washing operation.

<Dispersion>

In at least any time of obtaining the carboxy group-containing modified cellulose nanofiber from a cellulose raw material, obtaining the substituted carboxy group-containing modified cellulose nanofiber, and performing the defibration process, a dispersion process for the cellulose raw material or nanofibers may be performed to prepare a dispersion of the cellulose raw material. The solvent is not particularly limited as long as the solvent can disperse the cellulose raw material. Examples of the solvent include water, an organic solvent (for example, hydrophilic organic solvent such as methanol), and a solvent mixture thereof. The solvent to disperse the cellulose raw material is preferably water because the cellulose raw material is hydrophilic.

The solid content of the modified cellulose in the dispersion is generally 0.1% by weight or more, preferably 0.2% by weight or more, and more preferably 0.3% by weight or more. Thereby, the amount of liquid relative to the amount of the cellulose fiber raw material is adequate and efficient. The upper limit is generally 10% by weight or less, and preferably 6% by weight or less. Thereby, the flowability can be kept.

<Defibration>

Defibration may be performed to a cellulose raw material, may be performed to the substituted carboxy group-containing modified cellulose nanofiber at the time of obtaining the carboxy group-containing modified cellulose nanofiber from a cellulose raw material or at the time of obtaining the substituted carboxy group-containing modified cellulose nanofiber, or may be performed to both.

The apparatus used for the defibration process is not limited, and examples thereof include high speed rotary machines, colloid mill machines, high pressure machines, roll mill machines, and ultra sonic machines. A high-pressure or ultrahigh-pressure homogenizer is preferable, and a wet-type high-pressure or ultrahigh-pressure homogenizer is more preferable. It is preferable that the apparatus can apply a high shear force to the cellulose raw material or the modified cellulose (generally, dispersion). The pressure that the apparatus can apply is preferably 50 MPa or more, more preferably 100 MPa or more, and further preferably 140 MPa or more. The apparatus is preferably a wet-type high-pressure or ultrahigh-pressure homogenizer capable of applying the pressure within above ranges to the cellulose raw material or the modified cellulose (generally, dispersion) and applying a high shear force. Thereby, defibration can be performed efficiently. The number of times of processing (pass) in the defibration apparatus may be one or two or more, and preferably two or more.

When defibration is performed for a dispersion of a cellulose raw material, the solid concentration of the cellulose raw material in the dispersion is generally 0.1% by weight or more, preferably 0.2% by weight or more, and more preferably 0.3% by weight or more. Thereby, the amount of liquid relative to the amount of the cellulose fiber raw material is appropriate and efficient. The upper limit is generally 10% by weight or less, and preferably 6% by weight or less. Thereby, the flowability can be kept.

Prior to a defibration (defibration in a high-pressure homogenizer) or a dispersion process performed before defibration as needed, a preliminary process may be performed, if needed. The preliminary process may be performed using mixing, stirring, emulsifying, and dispersing apparatus such as a high-speed shear mixer.

<Form of Substituted Carboxy Group-Containing Modified Cellulose Nanofiber>

The form of the substituted carboxy group-containing modified cellulose nanofiber is not particularly limited, and examples thereof include a dispersion of the modified cellulose nanofiber, a dry solid of the dispersion, a wet solid of the dispersion, a mixed solution of the cellulose nanofiber and a water-soluble polymer, a dry solid of the mixed solution, and a wet solid of the mixed solution. The wet solid refers to a solid in the intermediate form between dispersion and dry solid. Examples of the water-soluble polymer include cellulose derivatives (carboxymethyl cellulose, methyl cellulose, hydroxypropyl cellulose, ethyl cellulose), xanthan gum, xyloglucan, dextrin, dextran, carrageenan, locust bean gum, alginic acid, alginates, pullulan, starches, potato starch, arrowroot starch, cationic starch, monostarch phosphate, corn starch, gum arabic, gellan gum, gellan gum, polydextrose, pectin, chitin, water-soluble chitin, chitosan, casein, albumin, soy protein solution, peptone, polyvinyl alcohol, polyacrylamide, sodium polyacrylate, polyvinylpyrrolidone, polyvinyl acetate, polyamino acids, polylactic acid, polymalic acid, polyglycerin, latex, rosin sizing agents, petroleum resin sizing agents, urea resins, melamine resins, epoxy resins, polyamide resins, polyamide-polyamine resins, polyethylene imines, polyamines, plant gums, polyethylene oxide, hydrophilic crosslinked polymers, polyacrylates, starch polyacrylate copolymers, tamarind gum, guar gum, and colloidal silica, and mixtures of two or more. Among those, carboxymethyl cellulose and a salt thereof are preferably used in terms of compatibility.

<Drying>

The dry solid and the wet solid of the substituted carboxy group-containing modified cellulose nanofiber may be prepared by drying a dispersion of the substituted carboxy group-containing modified cellulose nanofiber or a mixed solution of the substituted carboxy group-containing modified cellulose nanofiber and the water-soluble polymer. The drying process is not particularly limited, and examples thereof include spray drying, squeezing, air drying, hot air drying, and vacuum drying. Examples of a dryer include continuous tunnel dryers, band dryers, vertical dryers, vertical turbo dryers, multi-stage disc dryers, air drying dryers, rotary dryers, air stream dryers, spray dryer drying apparatuses, spray dryers, cylindrical dryers, cylinder dryers, drum dryers, screw conveyor dryers, rotary dryers with heating tubes, vibration transportation dryers, batch box type dryers, vacuum box type dryers, and stirring dryers. These dryers may be used singly or in combination of two or more. The dryer is preferably a drum dryer. Thereby, since heat energy can be directly and uniformly supplied to the object to be dried, the efficiency of the heat energy can be enhanced. In addition, the dried product can be recovered immediately without applying unnecessary heat.

<Rubber Composition>

The rubber composition of the present invention includes the substituted carboxy group-containing modified cellulose nanofiber and a rubber component.

<Rubber Component>

The rubber component is generally a component consisting mainly of an organic polymer and having a high elastic limit and a low elastic modulus. The rubber component is divided broadly into natural rubber and synthetic rubber. In the present invention, any of rubbers may be used, or both of rubbers may be used in combination. Examples of the synthetic rubber include diene rubbers such as butadiene rubber (BR), styrene-butadiene copolymer rubber (SBR), isoprene rubber (IR), acrylonitrile-butadiene rubber (NBR), acrylonitrile-styrene-butadiene copolymer rubber, chloroprene rubber, styrene-isoprene copolymer rubber, styrene-isoprene-butadiene copolymer rubber, and isoprene-butadiene copolymer rubber, ethylene-propylene rubber (EPM, EPDM), butyl rubber (IIR), acrylic rubber (ACM), epichlorohydrin rubber (CO, ECO), fluoro rubber (FKM), silicone rubber (Q), urethane rubber (U), and chlorosulfonyl polyethylene (CSM). Examples of the natural rubber include hydrogenated natural rubber and deproteinized natural rubber. The rubber components may be used singly or in combination of two or more. The rubber component may be solid or liquid. Examples of the liquid rubber component include a dispersion of the rubber component and a solution of the rubber component. Examples of the solvent include water and organic solvents.

<Methylene Acceptor Compound and Methylene Donor Compound>

The rubber composition may include a methylene acceptor compound and/or a methylene donor compound.

The methylene acceptor compound generally refers to a compound that can accept a methylene group and that can be mixed with the methylene donor compound and heated to cause a curing reaction. Examples of the methylene acceptor compound include phenolic compounds such as phenols, resorcinols, resorcins, and cresols, and derivatives thereof, resorcin resins, cresol resins, and phenolic resins. Examples of the phenolic resin include condensation products of above phenolic compounds as well as derivatives thereof and aldehyde compounds such as formaldehyde as well as acetoaldehyde. The phenolic resin can be classified, according to a catalyst in condensation, into novolac resin (acid catalyst) and resol resin (alkaline catalyst). In the present invention, any of the resins can be used. The phenolic resin may be modified by oil or a fatty acid. Examples of the oil and the fatty acid include rosin oil, tall oil, cashew oil, linoleic acid, oleic acid, and linoleic acid.

The methylene donor compound generally refers to a compound that can donate a methylene group and that can be mixed with the methylene acceptor compound and heated to cause a curing reaction. Examples of the methylene acceptor compound include hexamethylenetetramine and melamine derivatives. Examples of the melamine derivatives include hexamethylolmelamine, hexamethoxymethylmelamine, pentamethoxymethylmelamine, pentamethoxymethylolmelamine, hexaethoxymethylmelamine, and hexakis-(methoxymethyl) melamine.

Examples of a combination of the methylene acceptor compound and the methylene donor compound include a combination of cresol, a cresol derivative, or a cresol resin and pentamethoxymethylmelamine, a combination of resorcin, a resorcin derivative, or a resorcin resin and hexamethylenetetramine, a combination of a cashew-modified phenolic resin and hexamethylenetetramine, and a combination of a phenolic resin and hexamethylenetetramine. Among those, a combination of cresol, a cresol derivative, or a cresol resin and pentamethoxymethylmelamine and a combination of resorcin, a resorcin derivative, or a resorcin resin and hexamethylenetetramine are preferable.

The method of mixing the substituted carboxy group-containing modified cellulose fiber with the rubber component is not particularly limited, and example thereof is preferably a method of dispersing the substituted carboxy group-containing modified cellulose nanofiber and the rubber component in water, followed by mixing the resultant, because the substituted carboxy group-containing modified cellulose nanofiber can be uniformly dispersed in the rubber component. The method of removing water is not particularly limited, and examples thereof are methods of drying in an oven or of solidifying by adjusting the pH to 2 to 6 and dehydration as well as drying.

<Content Amount>

The content amount of the substituted carboxy group-containing modified cellulose nanofiber relative to the rubber component is preferably 0.1% by weight or more, more preferably 1% by weight or more, and further preferably 3% by weight or more, with respect to 100% by weight of the rubber component. Thereby, the effect of improving tensile strength can be sufficiently achieved. The upper limit is preferably 50% by weight or less, more preferably 40% by weight or less, and further preferably 30% by weight or less. Thereby, the workability in the manufacturing process can be kept. Therefore, it is preferably 0.1 to 50% by weight, more preferably 1 to 40% by weight, and further preferably 3 to 30% by weight.

When the rubber composition includes the methylene acceptor compound, its content is preferably 1% by weight, more preferably 1.3% by weight or more, and further preferably 1.5% by weight or more, with respect to 100% by weight of the rubber component. Thereby, the effect of improving tensile strength can be sufficiently achieved. The upper limit is preferably 50% by weight or less, preferably 20% by weight or less, further preferably 10% by weight or less. Thereby, the workability in the manufacturing process can be kept. Therefore, it is preferably 1 to 50% by weight, more preferably 1.3 to 20% by weight, and further preferably 1.5 to 10% by weight.

When the rubber composition includes the methylene donor compound, its content is preferably 10% by weight or more, more preferably 20% by weight or more, and further preferably 25% by weight or more, with respect to 100% by weight of the methylene acceptor compound. Thereby, the effect of improving tensile strength can be sufficiently achieved. The upper limit is preferably 100% by weight or less, preferably 90% by weight or less, further preferably 85% by weight or less. Thereby, the workability in the manufacturing process can be kept. Therefore, it is preferably 10 to 100% by weight, more preferably 20 to 90% by weight, and further preferably 25 to 85% by weight.

The rubber composition of the present invention may include one or two or more optional components, if needed. Examples of the optional components include compounding agents that may be generally used in the rubber industry, such as reinforcing agent (for example, carbon black, silica), silane coupling agent, zinc oxide, stearic acid, compounding agents for crosslinking (for example, crosslinking agents such as sulfur, vulcanization accelerator, vulcanization accelerator aid, scorch retarder), oil, hardened resin, wax, antioxidant, coloring agent, peptizer, softener/plasticizer, hardener (for example, phenolic resin, high styrene resin), foaming agent, filler (for example, carbon black, silica), coupling agent, adhesives (for example, macron resin, phenol, terpene resin, petroleum hydrocarbon resin, rosin derivative), disperser (for example, fatty acid), adhesion accelerator (for example, organic cobalt salt), and lubricant (for example, paraffin and hydrocarbon resin, fatty acid and fatty acid derivatives). Among those, sulfur and a vulcanization accelerator are preferable. An example of the vulcanization accelerator is N-t-butyl-2-benzothiazolesulfenamide.

When the rubber composition of the present invention includes the sulfur, it is possible to vulcanize the rubber component. In addition, a crosslink structure can be formed between the modified substituent in the modified cellulose fiber and the rubber component. The sulfur content is preferably 0.1 part by weight or more, more preferably 0.5 part by weight or more, and further preferably 1 part by weight or more, with respect to 100 parts by weight of the rubber component. The upper limit is preferably 50 parts by weight or less, preferably 35 parts by weight or less, further preferably 20 parts by weight or less. Therefore, it is preferably about 0.1 to 50 parts by weight, more preferably about 0.5 to 35 parts by weight, and further preferably about 1 to 20 parts by weight.

When the rubber composition includes the vulcanization accelerator, its content relative to the rubber component is preferably 0.1% by weight or more, more preferably 0.3% by weight or more, further preferably 0.4% by weight or more. The upper limit is preferably 5% by weight or less, preferably 3% by weight or less, and further preferably 2% by weight or less.

<Manufacturing Method>

The rubber composition can be manufactured by mixing the substituted carboxy group-containing modified cellulose nanofiber and the rubber component, and each component included if needed.

The order of adding the components in mixing is not limited. Each of the components may be mixed at a time, or any of the components may be mixed in advance and subsequently other components may be mixed. As a first example, the modified cellulose nanofiber and the rubber component are mixed in advance, and the other components (for example, stearic acid) are mixed to the resultant masterbatch. Specifically, for example, a dispersion of the modified cellulose nanofiber and a dispersion (latex) of the rubber component are mixed (example: stirring by a mixer), and water is removed. Then, the components including stearic acid is added to the resultant masterbatch (generally, solid), followed by mastication and kneading (example: apparatus such as open roll mill). Thereby, the substituted carboxy group-containing modified cellulose nanofiber can be dispersed uniformly in the rubber component.

As a second example, the each of the components including the substituted carboxy group-containing modified cellulose nanofiber, the rubber component, and other components added if needed are mixed at a time, and water is removed. Specifically, for example, a dispersion of the substituted carboxy group-containing modified cellulose nanofiber, a dispersion (latex) of the rubber component, and other components are mixed (example: stirring by a mixer), and water is removed from the resultant mixture. Thereby, every components can be dispersed uniformly.

The method of removing water from the masterbatch or the mixture is not limited, and examples thereof are methods by drying with a drier such as oven, by solidifying by adjusting the pH to 2 to 6 and then dehydration and drying, and by adding an acid such as formic acid, sulfuric acid, and organic acid or salt such as sodium chloride to the mixture and then solidifying.

As a third example, the components other than the rubber component are added to the rubber component in any given order and mixed. Specifically, for example, to the rubber component, the solid of the modified cellulose nanofiber and other components added if needed are mixed in any given order and masticated and kneaded similarly using apparatus such as an open roll mill. Thereby, it is possible to eliminate the process of removing water.

Examples of the mastication and kneading apparatus include apparatus capable of mixing or stirring, such as mixer, blender, twin screw kneader, kneader, laboplast mill, homogenizer, high-speed homogenizer, high-pressure homogenizer, open roll mill, planetary type stirrer, and three roll mill.

The temperature in mixing (for example, in mastication and kneading) may be approximately room temperature (about 15 to 30° C.) or may be increased to a high temperature to such an extent that a crosslinking reaction does not occur in the rubber component. For example, the temperature in mixing is 140° C. or lower, and more preferably 120° C. or lower. Moreover, the lower limit is 70° C. or higher, and preferably 80° C. or higher. Therefore, the heating temperature is preferably about 70 to 140° C., and more preferably about 80 to 120° C. The timing of adding sulfur and the vulcanization accelerator is preferably later than the timing of adding the methylene acceptor compound and the methylene donor compound. More specifically, the materials including the methylene acceptor compound and the methylene donor compound are mixed without adding sulfur and the vulcanization accelerator. After the start of mastication, sulfur and the vulcanization accelerator are added, and the resultant is further masticated and kneaded. Thereby, the methylene acceptor compound and the methylene donor compound are preliminarily condensed by heating, and the interaction of the condensation product with the rubber component as well as the chemically modified cellulose nanofiber takes place effectively.

After the termination of mixing, molding may be performed, if needed. Examples of the molder include apparatus for a variety of molding, such as die molding, injection molding, extrusion molding, hollow molding, and foam molding. The molder can be selected as appropriate according to the shape, use application, and molding method of the final product. Examples of the shape of the mold material include sheet, pellet, and powder.

It is preferable to perform heating (vulcanization, crosslinking) after termination of mixing and preferably before molding. The methylene acceptor compound and the methylene donor compound are condensed by heating to form a three-dimensional network structure. This structure interacts with each of the rubber component and the cellulose nanofiber, thereby effectively reinforcing the rubber composition.

As for crosslinking, the temperature is not limited as long as a crosslinking reaction proceeds. Generally, the kneaded masterbatch is heated for crosslinking (which may be called vulcanization, if sulfur is included) to obtain a rubber composition. The heating temperature is preferably 140° C. or higher, preferably 200° C. or lower, and more preferably 180° C. or lower. Therefore, the heating temperature is preferably about 140 to 200° C., and more preferably 140 to 180° C. Examples of the heater include vulcanizers for mold curing, for autoclave curing, and for continuous curing. Example of the vulcanization process is press vulcanization.

A finishing process may be performed if needed before producing the final product. Examples of the finishing process include polishing, surface treatment, lip finishing, lip cutting, and chlorination. These processes may be performed singly or in combination of two or more.

Examples of the application of the vulcanized rubber composition of the present invention is not particularly limited, and examples thereof include transportation equipment such as automobiles, electric trains, shipping, and airplanes; electric appliances such as personal computers, televisions, telephones, and clocks; mobile communication equipment such as portable phones; portable music players, video players, printers, copiers, sporting goods, and the like; construction materials; business equipment such as writing materials, cases, and containers. The invention is not limited to these applications, and may be applied to rubber or soft plastic materials, preferably applied to tires. Examples of the tires include air tires for passenger cars, trucks, buses, and heavy vehicles.

EXAMPLES

Although the present invention will be described in more detail below with examples, the present invention is not intended to be limited by those. The numerical values in examples are measured/calculated by the method provided in the description, unless otherwise specified.

<Production Example 1> Production of Substituted Carboxy Group-Containing Modified Cellulose Nanofiber To 500 ml of an aqueous solution including 1.95 g (0.025 mmol relative to 1 gram of bone-dry cellulose) of TEMPO (manufactured by Sigma Aldrich) and 51.4 g of sodium bromide (1 mmol relative to 1 gram of bone-dry cellulose), 500 g (bone dry) of a softwood-derived bleached unbeaten kraft pulp (whiteness 85%) was added and stirred until the pulp was uniformly dispersed. To the reaction system, an aqueous sodium hypochlorite was added such that sodium hypochlorite was 6.0 mmol/g to start an oxidation reaction. During reaction, although the pH in the system was reduced, a 3M aqueous sodium hydroxide was successively added to adjust the pH to 10. The reaction was terminated at the point of time when sodium hypochlorite was consumed and the pH in the system did not change. Hydrochloric acid was added to the mixture after the reaction to adjust the pH to 2.4, and subsequently the resultant was passed through a glass filter to separate the pulp. The pulp was sufficiently washed with water to obtain oxidized pulp (oxidized (carboxylated) cellulose nanofiber). The pulp yield at this time was 90%, the time required for the oxidation reaction was 90 minutes, and the carboxy group content was 1.6 mmol/g.

Then, 11.8 g of the oxidized pulp obtained by the process above was adjusted with water to 1% (w/v), and 25.2 g of oleylamine (manufactured by Tokyo Chemical Industry Co., Ltd.) and 16.4 g of EDC.HCl (5 by mole with respect to the carboxy group in the oxidized cellulose nanofiber) were added and stirred at room temperature for three hours to perform a dehydration condensation reaction.

After the reaction, the by-product and the like were separated and removed by washing to obtain a modified pulp. The reaction rate of oleylamine was 88%.

The modified pulp obtained by the process above was adjusted with water to 1.0% (w/v), and then processed three times by an ultrahigh-pressure homogenizer (20° C., 150 Mpa) to obtain an aqueous dispersion of the substituted carboxy group-containing modified cellulose nanofiber. The substituted carboxy group-containing modified cellulose nanofiber had an average fiber diameter of 4 nm and an aspect ratio of 150.

<Production Example 2> Production of Substituted Carboxy Group-Containing Modified Cellulose Nanofiber To a stirrer capable of mixing pulp, 253 g in dry mass of pulp (NBKP (softwood bleached kraft pulp) manufactured by NIPPON PAPER INDUSTRIES CO., LTD.) and 56.3 g in dry mass of sodium hydroxide (0.9 by mole per glucose residue of pulp) were added, and water was added such that the pulp solid content was 20% (w/v). Subsequently, after stirring at 30° C. for 30 minutes, 127 g (0.7 by mole per glucose residue of pulp) of sodium monochloroacetate was added. After stirring for 30 minutes, the temperature was increased to 70° C. and the mixture was stirred for one hour. Subsequently, the reaction product was taken out, neutralized, and washed to obtain carboxylmethylated pulp having the degree of substitution with carboxymethyl group of 0.25 per glucose unit.

The carboxymethylated pulp obtained by the process above was adjusted with water to 1% (w/v), and 25.2 g of oleylamine (manufactured by Tokyo Chemical Industry Co., Ltd.) and 16.4 g of EDC.HCl (5 by mole with respect to the carboxymethyl group per glucose unit of the carboxymethyl cellulose nanofiber) were added and stirred at room temperature for three hours to perform a dehydration condensation reaction. After the reaction, the by-product and the like were separated and removed by washing to obtain modified pulp. The reaction rate of oleylamine was 79%.

Subsequently, the carboxymethylated pulp was adjusted with water to a solid content of 1%, and then processed five times by a high-pressure homogenizer at 20° C. and a pressure of 150 MPa for defibration to obtain an aqueous dispersion of the substituted carboxy group-containing modified cellulose nanofiber. The substituted carboxy group-containing modified cellulose nanofiber had an average fiber diameter of 15 nm and an average aspect ratio of 100.

<Production Example 3> Production of Substituted Carboxy Group-Containing Modified Cellulose Nanofiber A substituted carboxy group-containing modified cellulose nanofiber was obtained in the same manner as in Production Example 1, except that oleylamine in Production Example 1 was changed to 1-hexenylamine. The reaction rate of 1-hexenylamine in the substituted carboxy group-containing modified cellulose nanofiber was 85%, the average fiber diameter was 4 nm, and the average aspect ratio was 150.

<Production Example 4> Production of Substituted Carboxy Group-Containing Modified Cellulose Nanofiber A substituted carboxy group-containing modified cellulose nanofiber was obtained in the same manner as in Production Example 1, except that oleylamine in Production Example 1 was changed to oleyl alcohol (manufactured by Tokyo Chemical Industry Co., Ltd.). The reaction rate of oleyl alcohol in the substituted carboxy group-containing modified cellulose nanofiber was 64%, the average fiber diameter was 4 nm, and the average aspect ratio was 150.

<Comparative Production Example 1> Production of Carboxy Group-Containing Modified Cellulose Nanofiber A carboxy group-containing modified cellulose nanofiber (oxidized cellulose nanofiber) was obtained in the same manner as in Production Example 1 except that the oxidized pulp was defibrated without a dehydration condensation reaction in Production Example 1. The carboxy group-containing modified cellulose nanofiber had a carboxy group content of 1.6 mmol/g, had an average fiber diameter of 4 nm, and an average aspect ratio of 150.

The carboxy group content, the degree of substitution with carboxymethyl group, and the oleylamine reaction rate in Production Examples above were determined by the methods described above.

Example 1

To 100 g of a natural rubber latex (trade name: HA latex, Regitex Co., Ltd, solid concentration 65%), a 1% aqueous dispersion of the modified cellulose nanofiber obtained in Production Example 1 was mixed in the amount of 5% by weight as the amount of the bone-dry modified cellulose nanofiber with respect to the bone-dry solid content of the latex, and stirred by a TK homomixer (8000 rpm) for 60 minutes. This aqueous suspension was dried in a heating oven at 70° C. for 10 hours to obtain a masterbatch.

To the masterbatch obtained by the process above, 6% by weight of zinc oxide and 0.5% by weight of stearic acid with respect to the rubber component in the masterbatch were mixed, and kneaded by an open roll mill (manufactured by KANSAI ROLL Co., Ltd.) at 30° C. for 10 minutes to obtain a kneaded product. To this kneaded product, 3.5% by weight of sulfur and 0.7% by weight of a vulcanization accelerator (BBS, N-t-butyl-2-benzothiazolesulfenamide) with respect to the rubber component in the kneaded product were added, and kneaded using an open roll mill (manufactured by KANSAI ROLL Co., Ltd.) at 30° C. for 10 minutes to produce an unvulcanized rubber composition sheet. The resultant unvulcanized rubber composition sheet was sandwiched between dies, and press-vulcanized at 150° C. for 10 minutes to obtain a 2 mm-thick vulcanized rubber sheet.

The resultant vulcanized rubber sheet was cut into a test piece with a predetermined shape, and stress and breaking strength at 100% strain and at 300% strain were determined as indicators of tensile strength, in accordance with JIS K6251 "Rubber, vulcanized or thermoplastic—Determination of tensile stress-strain properties". The larger value indicates that the vulcanized rubber composition is reinforced well and the mechanical strength of the rubber is excellent.

Example 2

The process was performed in the same manner as in Example 1, except that the substituted carboxy group-containing modified cellulose nanofiber in Example 1 was changed to the substituted carboxy group-containing modified cellulose nanofiber obtained in Production Example 2.

Example 3

The process was performed in the same manner as in Example 1, except that the substituted carboxy group-containing modified cellulose nanofiber in Example 1 was changed to the substituted carboxy group-containing modified cellulose nanofiber obtained in Production Example 3.

Example 4

The process was performed in the same manner as in Example 1, except that the substituted carboxy group-containing modified cellulose nanofiber in Example 1 was changed to the substituted carboxy group-containing modified cellulose nanofiber obtained in Production Example 4.

Comparative Example 1

The process was performed in the same manner as in Example 1, except that the substituted carboxy group-containing modified cellulose nanofiber in Example 1 was changed to the carboxy group-containing modified cellulose nanofiber obtained in Comparative Production Example 1.

Comparative Example 2

The process was performed in the same manner as in Example 1, except that cellulose nanofiber was not mixed to the rubber component in Example 1.

TABLE 1

| | Example | | | | Comparative Example | |
|---|---|---|---|---|---|---|
| | 1 | 2 | 3 | 4 | 1 | 2 |
| Inclusion of cellulose nanofiber | Included | Included | Included | Included | Included | Not included |
| Modification method of cellulose nanofiber | Oxidation | Carboxy methylation | Oxidation | Oxidation | Oxidation | |
| Introduction of unsaturated hydrocarbon group into cellulose nanofiber | Introduced | Introduced | Introduced | Introduced | Not introduced | |
| Unsaturated amine or unsaturated alcohol used in dehydration condensation | Oleylamine | Oleylamine | 1-hexenyl amine | Oleyl alcohol | | |
| Stress at 100% strain [MPa] | 3.3 | 3.0 | 3.5 | 2.5 | 1.4 | 0.9 |
| Stress at 300% strain [MPa] | 9.2 | 8.7 | 9.6 | 8.1 | 4.3 | 2.3 |
| breaking strength [MPa] | 26 | 27 | 24 | 24 | 23 | 22 |

Table 1 clearly shows the followings. In the vulcanized rubber compositions in Examples 1 to 4 containing the modified cellulose nanofiber in which an unsaturated hydrocarbon group is introduced, compared to the vulcanized rubber composition in Comparative Example 1 containing the modified cellulose nanofiber in which an unsaturated hydrocarbon group is not introduced, the stress is high both at 100% strain and at 300% strain, and the breaking strength is also high. There is no significant difference in stress and breaking strength between the vulcanized rubber composition in Comparative Example 1 and the rubber composition in Comparative Example 2, whereas the stress and the breaking strength of the vulcanized rubber compositions in Examples 1 to 4 are significantly high compared to the rubber composition in Comparative Example 2. These results indicate that the substituted carboxy group-containing modified cellulose nanofiber is useful for reinforcing a rubber composition and that the rubber composition including the substituted carboxy group-containing modified cellulose nanofiber exhibits satisfactory mechanical strength, and these findings can be used in production of the rubber composition.

The invention claimed is:

1. A substituted carboxy group-containing modified cellulose nanofiber, wherein at least part of a carboxy group-containing modified cellulose nanofiber comprises at least any one of a substituent represented by Formula (a) and a substituent represented by Formula (b) below:

—CONH—R$^1$, and      Formula (a):

—COO—R$^1$,      Formula (b):

where R$^1$ is independently a C$_{3-30}$ hydrocarbon having at least one unsaturated bond.

2. The substituted carboxy group-containing modified cellulose nanofiber according to claim 1, wherein the carboxy group-containing modified cellulose nanofiber is an oxidized cellulose nanofiber or a carboxymethylated cellulose nanofiber.

3. The substituted carboxy group-containing modified cellulose nanofiber according to claim 2, wherein
the carboxy group-containing modified cellulose nanofiber is an oxidized cellulose nanofiber; and
a carboxy group content of the oxidized cellulose nanofiber is 0.6 mmol/g to 2.0 mmol/g with respect to a bone-dry mass of the oxidized cellulose nanofiber.

4. The substituted carboxy group-containing modified cellulose nanofiber according to claim 2, wherein
the carboxy group-containing modified cellulose nanofiber is a carboxymethylated cellulose nanofiber; and
a degree of substitution with carboxymethyl group per glucose unit of the carboxymethylated cellulose nanofiber is 0.01 to 0.50.

5. The substituted carboxy group-containing modified cellulose nanofiber according to claim 1, wherein the substituted carboxy group-containing modified cellulose nanofiber is at least any one of an amidation product of an aliphatic unsaturated amine and the carboxy group-containing modified cellulose nanofiber and an esterification product of an aliphatic unsaturated alcohol and the carboxy group-containing modified cellulose nanofiber.

6. The substituted carboxy group-containing modified cellulose nanofiber according to claim 5, wherein
a reaction rate of the aliphatic unsaturated amine is 10% or more when the substituted carboxy group-containing modified cellulose nanofiber is the amidation product; and
a reaction rate of the aliphatic unsaturated alcohol is 10% or more when the substituted carboxy group-containing modified cellulose nanofiber is the esterification product.

7. A manufacturing method of a substituted carboxy group-containing modified cellulose nanofiber, the method comprising:
introducing at least any one of substituent selected from the group consisting of a substituent represented by Formula (a) and a substituent represented by Formula (b) below into at least part of a carboxy group-containing modified cellulose nanofiber; and
performing a dehydration condensation in water:

—CONH—R$^1$, and      Formula (a):

—COO—R$^1$,      Formula (b):

where R$^1$ is independently a C$_{3-30}$ hydrocarbon having at least one unsaturated bond.

8. The manufacturing method according to claim 7, wherein the dehydration condensation is performed by using at least one dehydration condensation agent selected from the group consisting of 1-ethyl-3-(3-dimethylaminopropyl)-carbodiimide, a hydrochloride thereof, and 4-(4,6-dimethoxy-1,3,5-triazin-2-yl)-4-methylmorpholinium chloride n-hydrate.

9. The manufacturing method according to claim 7, wherein the introducing of at least one substituent selected from the group consisting of the substituent represented by Formula (a) and the substituent represented by Formula (b) is performed by introducing at least any one of an aliphatic unsaturated amine and an aliphatic unsaturated alcohol into the carboxy group-containing modified cellulose nanofiber.

10. The manufacturing method according to claim 9, wherein
a reaction rate of the aliphatic unsaturated amine is 10% or more when the aliphatic unsaturated amine is introduced into the carboxy group-containing modified cellulose nanofiber; and
a reaction rate of the aliphatic unsaturated alcohol is 10% or more when the aliphatic unsaturated alcohol is introduced into the carboxy group-containing modified cellulose nanofiber.

11. A manufacturing method of producing a rubber composition, the method comprising:
manufacturing a substituted carboxy group-containing modified cellulose nanofiber by the manufacturing method according to claim 7; and
performing vulcanization after the dehydration condensation.

12. A rubber composition, comprising:
the substituted carboxy group-containing modified cellulose nanofiber according to claim 1; and
a rubber component.

13. The rubber composition according to claim 12, further comprising sulfur.

* * * * *